United States Patent
Sekizuka et al.

(10) Patent No.: US 11,491,060 B2
(45) Date of Patent: Nov. 8, 2022

(54) WHEELCHAIR-BOUND PASSENGER RESTRAINT DEVICE

(71) Applicant: Toyota Jidosha Kabushiki Kaisha, Toyota (JP)

(72) Inventors: Makoto Sekizuka, Toyota (JP); Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 16/854,308

(22) Filed: Apr. 21, 2020

(65) Prior Publication Data
US 2021/0000668 A1    Jan. 7, 2021

(30) Foreign Application Priority Data

Jul. 4, 2019   (JP) .............................. JP2019-125379

(51) Int. Cl.
*A61G 3/08* (2006.01)
*B60R 22/12* (2006.01)
(Continued)

(52) U.S. Cl.
CPC ............ *A61G 3/0808* (2013.01); *B60R 22/12* (2013.01); *B60R 22/18* (2013.01); *B60R 22/343* (2013.01); *A61G 2200/34* (2013.01)

(58) Field of Classification Search
CPC .. A61G 3/0808; A61G 2200/34; B60R 22/12; B60R 22/18; B60R 22/343;
(Continued)

(56) References Cited

U.S. PATENT DOCUMENTS

| 7,040,847 B1* | 5/2006 | Cardona | ................. B60P 3/079 |
| | | | 410/12 |
| 2019/0133853 A1* | 5/2019 | Girardin | ................. B60R 22/20 |

(Continued)

FOREIGN PATENT DOCUMENTS

| EP | 2016925 A1 * | 1/2009 | ............... A61G 3/02 |
| EP | 2570105 A1 * | 3/2013 | ............... A61G 3/08 |

(Continued)

OTHER PUBLICATIONS

U.S. Appl. No. 16/854,259, filed Apr. 21, 2020 Inventors: Makoto Sekizuka et al.
(Continued)

*Primary Examiner* — Paul N Dickson
*Assistant Examiner* — Matthew D Lee
(74) *Attorney, Agent, or Firm* — Dinsmore & Shohl LLP

(57) ABSTRACT

A wheelchair-bound passenger restraint device has a wheelchair retractor that rewinds one end portion of a wheelchair belt member in an extractable manner, a wheelchair buckle that can be fitted with a wheelchair tongue plate, a passenger retractor that rewinds one end portion of a passenger belt member in an extractable manner, a passenger buckle that can be fitted with a passenger tongue plate, a buckle sensor that detects that the wheelchair tongue plate has been fitted to the wheelchair buckle, and a passenger belt lock mechanism that is configured to be able to make a changeover between a locked state making the passenger belt member unextractable an unlocked state making the passenger belt member extractable, and that makes a changeover from the locked state to the unlocked state when it is detected that the wheelchair tongue plate has been fitted to the wheelchair buckle.

5 Claims, 7 Drawing Sheets

(51) Int. Cl.
*B60R 22/343* (2006.01)
*B60R 22/18* (2006.01)

(58) Field of Classification Search
CPC .......... B60R 22/357; B60R 2022/4816; B60R 22/48; A61F 5/3776; A61F 5/3792
See application file for complete search history.

(56) References Cited

U.S. PATENT DOCUMENTS

2020/0093662 A1* 3/2020 Mori .................... B60N 2/3047
2021/0000667 A1* 1/2021 Sekizuka ............. A61G 3/0808

FOREIGN PATENT DOCUMENTS

| EP | 2570105 A1 | 3/2013 |
|----|------------|--------|
| JP | H08089532 A | 4/1996 |
| JP | 2001-047969 A | 2/2001 |
| JP | 2002-209946 A | 7/2002 |
| JP | 2007-222278 A | 9/2007 |
| JP | 2017-148445 A | 8/2017 |
| JP | 2018-090143 A | 6/2018 |

OTHER PUBLICATIONS

U.S. Appl. No. 16/854,197, filed Apr. 21, 2020 Inventor: Makoto Sekizuka.

\* cited by examiner

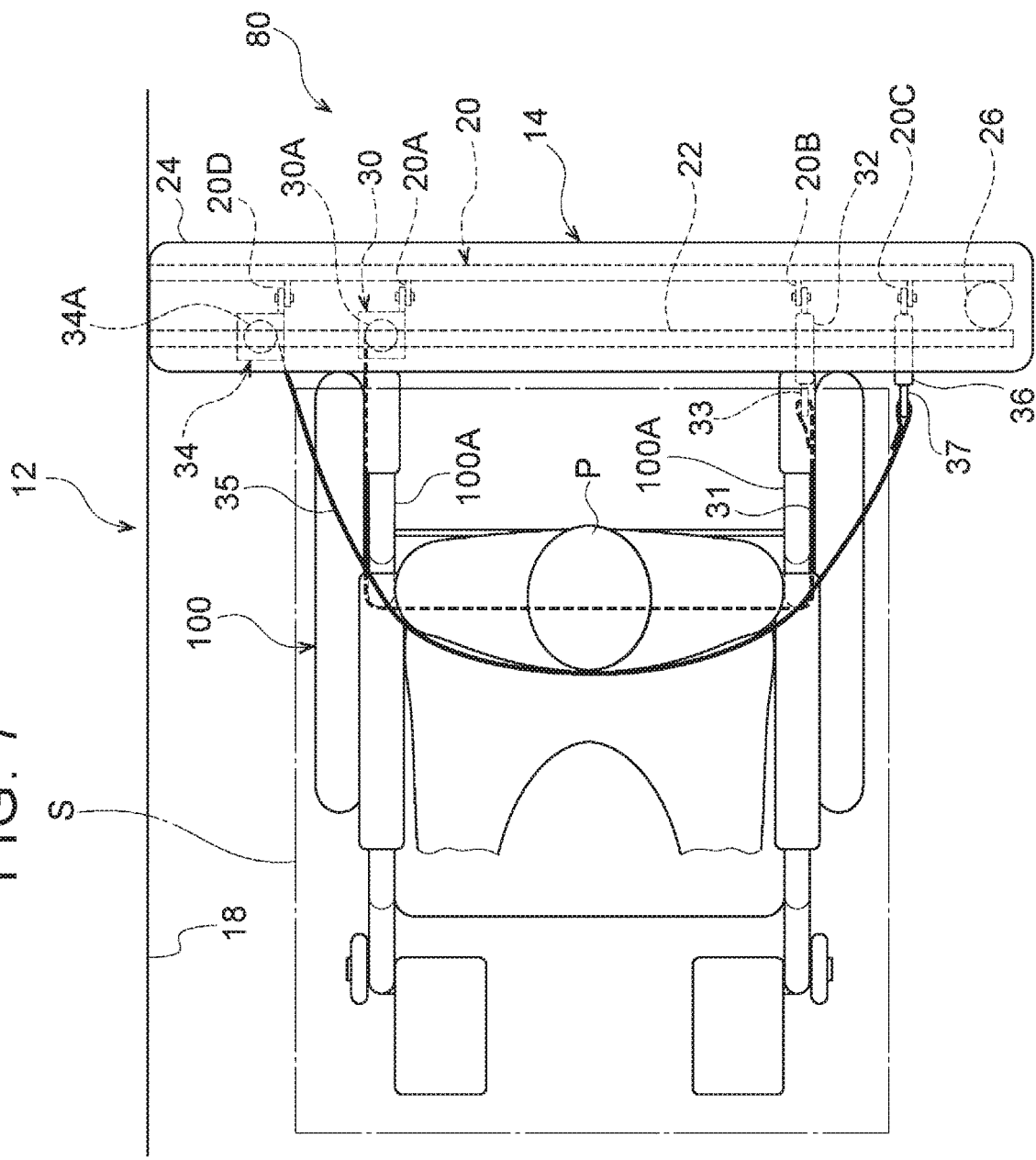

WHEELCHAIR-BOUND PASSENGER RESTRAINT DEVICE

CROSS-REFERENCE TO RELATED APPLICATIONS

This application claims priority to Japanese Patent Application No. 2019-125379 filed on Jul. 4, 2019, which is incorporated herein by reference in its entirety including the specification, drawings and abstract.

BACKGROUND

1. Technical Field

The disclosure relates to a wheelchair-bound passenger restraint device.

2. Description of Related Art

In Japanese Patent Application Publication No. 2017-148445 (JP 2017-148445 A), there is disclosed a wheelchair fixation device that binds a wheelchair to a cabin floor by a binding belt (a wheelchair belt member) and that restrains a passenger by a passenger belt (a passenger belt member). Besides, in Japanese Patent Application Publication No. 2018-90143 (JP 2018-90143 A), there is disclosed a structure that fixes (binds) a wheelchair to a floor by a belt and that restrains a passenger sitting in the wheelchair by hanging a seat belt around the passenger's body.

SUMMARY

However, in the case where the wheelchair is bound after restraining the passenger, the performance of operation may become difficult due to restrictions imposed on the movement of the passenger. Besides, the binding of the wheelchair may be forgotten, so there is a room for improvement.

In view of the aforementioned fact, the disclosure aims at obtaining a wheelchair-bound passenger restraint device that can efficiently bind a wheelchair and restrain a passenger while restraining the wheelchair from being forgotten to be bound.

A wheelchair-bound passenger restraint device according to a first aspect has a wheelchair retractor that rewinds one end portion of a wheelchair belt member in an extractable manner, a wheelchair buckle that can be fitted with a wheelchair tongue plate that is attached to the other end portion of the wheelchair belt member, a passenger retractor that rewinds one end portion of a passenger belt member in an extractable manner, a passenger buckle that can be fitted with a passenger tongue plate that is attached to the other end portion of the passenger belt member, a buckle sensor that detects that the wheelchair tongue plate has been fitted to the wheelchair buckle, and a passenger belt lock mechanism that is configured to be able to make a changeover between a locked state in which the passenger belt member cannot be extracted and an unlocked state in which the passenger belt member can be extracted, and that makes a changeover from the locked state to the unlocked state when the buckle sensor detects that the wheelchair tongue plate has been fitted to the wheelchair buckle.

In the wheelchair-bound passenger restraint device according to the first aspect, the one end portion of the wheelchair belt member has been rewound in an extractable manner by the wheelchair retractor, and the wheelchair tongue plate is attached to the other end portion of the wheelchair belt member. Besides, the wheelchair tongue plate can be fitted to the wheelchair buckle. Thus, when the wheelchair belt member is extracted from the wheelchair retractor and passed through a frame of a wheelchair and the wheelchair tongue plate is fitted to the wheelchair buckle, the wheelchair can be bound.

On the other hand, the one end portion of the passenger belt member has been rewound in an extractable manner by the passenger retractor, and the passenger tongue plate is attached to the other end portion of the passenger belt member. Moreover, the passenger tongue plate can be fitted to the passenger buckle. Thus, when the passenger belt member is extracted from the passenger retractor and the passenger tongue plate is fitted to the passenger buckle, the passenger in the wheelchair can be restrained.

Besides, when the buckle sensor detects that the wheelchair tongue plate has been fitted to the wheelchair buckle, the passenger belt lock mechanism makes a changeover from the locked state to the unlocked state. Thus, the passenger belt member cannot be extracted before binding the wheelchair, so the wheelchair can be restrained from being forgotten to be bound. Furthermore, the passenger is restrained after binding the wheelchair, so no restrictions are imposed on the movement of the passenger in binding the wheelchair.

A wheelchair-bound passenger restraint device according to a second aspect is obtained by modifying the first aspect as follows. That is, the passenger belt lock mechanism is configured to be able to electrically make a changeover between the locked state and the unlocked state.

In the wheelchair-bound passenger restraint device according to the second aspect, a simpler structure can be realized than in a configuration in which a changeover between the locked state of the passenger belt member and the unlocked state of the passenger belt member is mechanically made.

A wheelchair-bound passenger restraint device according to a third aspect is obtained by modifying the first aspect or second aspect as follows. That is, the wheelchair-bound passenger restraint device is further equipped with a wheelchair belt lock mechanism that makes the wheelchair belt member unextractable from the wheelchair retractor when the buckle sensor detects that the wheelchair tongue plate has been fitted to the wheelchair buckle.

In the wheelchair-bound passenger restraint device according to the third aspect, the wheelchair belt member can be made unextractable by the wheelchair belt lock mechanism, simply by fitting the wheelchair tongue plate to the wheelchair buckle.

A wheelchair-bound passenger restraint device according to a fourth aspect is obtained by modifying any one of the first to third aspects as follows. That is, the wheelchair buckle and the passenger buckle are disposed at a height reachable by hands of a passenger sitting in a wheelchair, on an upright member erected in a cabin.

In the wheelchair-bound passenger restraint device according to the fourth aspect, the passenger sitting in the wheelchair can extract the wheelchair belt member from the wheelchair retractor disposed on the upright member. Besides, by the same token, the passenger sitting in the wheelchair can extract the passenger belt member from the passenger retractor. Incidentally, "the height reachable by the hands of the passenger sitting in the wheelchair" mentioned herein means a height that can be reached by the hands of an adult woman with a standard body type who sits in the wheelchair.

A wheelchair-bound passenger restraint device according to a fifth aspect is obtained by modifying the fourth aspect as follows. That is, the passenger retractor and the wheelchair buckle are disposed at heights that are different from each other in a vehicle vertical direction.

In the wheelchair-bound passenger restraint device according to the fifth aspect, the wheelchair belt member is made unlikely to become an obstacle in extracting the passenger belt member from the passenger retractor to restrain the passenger after binding the wheelchair, by disposing the passenger retractor and the wheelchair buckle at the heights that are different from each other.

As described above, with the wheelchair-bound passenger restraint device according to claim 1, the binding of the wheelchair and the restraint of the passenger can be efficiently carried out while restraining the wheelchair from being forgotten to be bound.

With the wheelchair-bound passenger restraint device according to the second aspect, the passenger belt lock mechanism can be made smaller in size than in the configuration in which a changeover between the locked state of the passenger belt member and the unlocked state of the passenger belt member is mechanically made.

With the wheelchair-bound passenger restraint device according to the third aspect, the extraction of the wheelchair belt member can be locked without requiring the passenger to perform any special operation.

With the wheelchair-bound passenger restraint device according to the fourth aspect, the wheelchair can be bound by the hands of the passenger sitting in the wheelchair.

With the wheelchair-bound passenger restraint device according to the fifth aspect, the passenger can be more smoothly restrained than in a structure in which the passenger retractor and the wheelchair buckle are disposed at the same height.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a plan view corresponding to FIG. 2, showing a second modification example of the wheelchair-bound passenger restraint device according to the embodiment.

DETAILED DESCRIPTION OF EMBODIMENTS

A wheelchair-bound passenger restraint device 10 according to one of the embodiments will be described hereinafter with reference to the drawings. Incidentally, arrows FR, UP, and RH denote a traveling direction of a vehicle to which the wheelchair-bound passenger restraint device is applied (a vehicle front side), a vehicle upper side, and a vehicle right side respectively. When description is given using a longitudinal direction, a lateral direction, and a vertical direction, these directions indicate the front and back in the longitudinal direction of the vehicle, the right and left with the vehicle oriented in the traveling direction, the up and down in the vertical direction of the vehicle, respectively.

Figure 1:
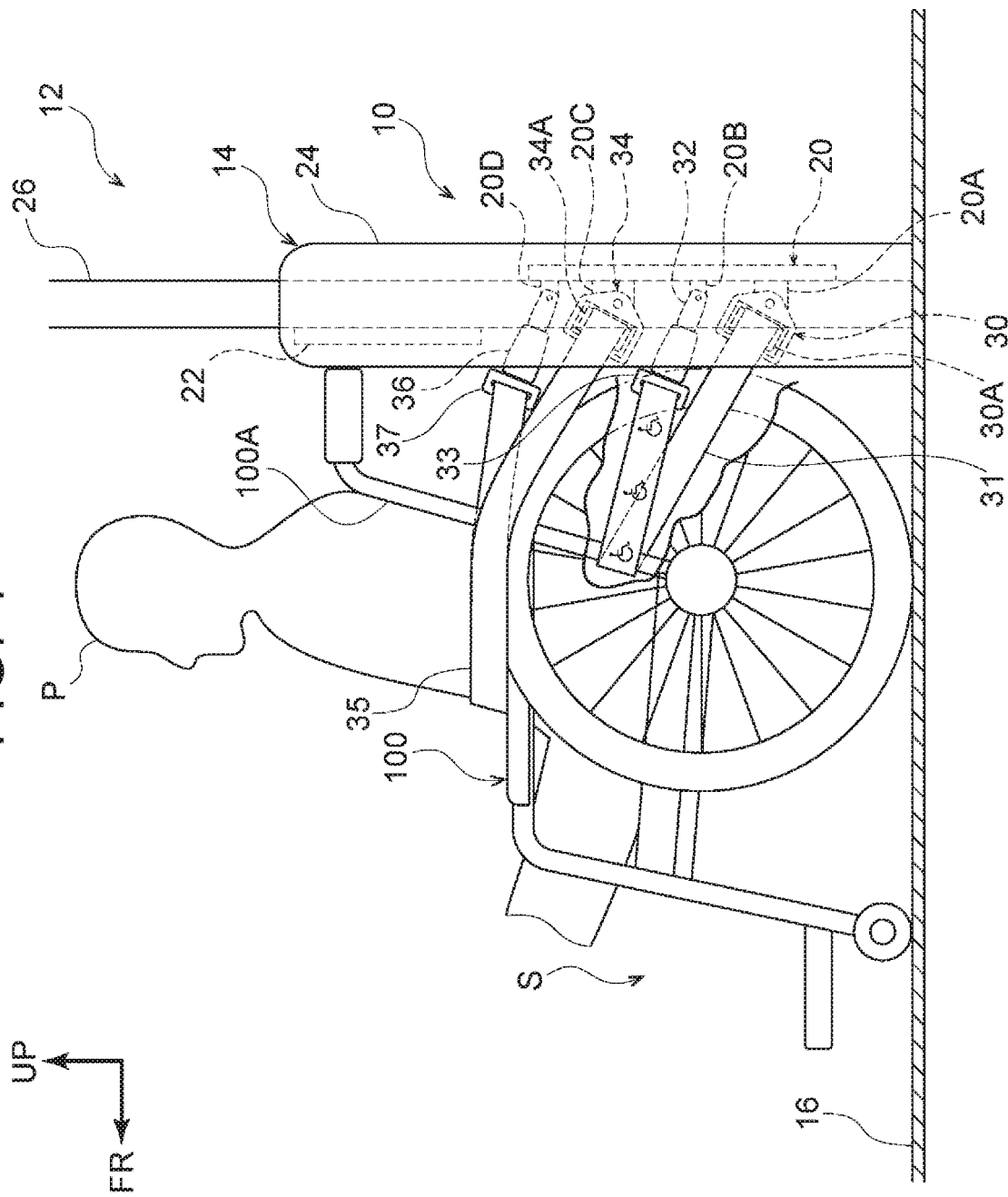
FIG. 1 is a lateral view of a cabin interior of a vehicle to which a wheelchair-bound passenger restraint device according to one of the embodiments is applied, as viewed in a vehicle width direction.
Figure 2:
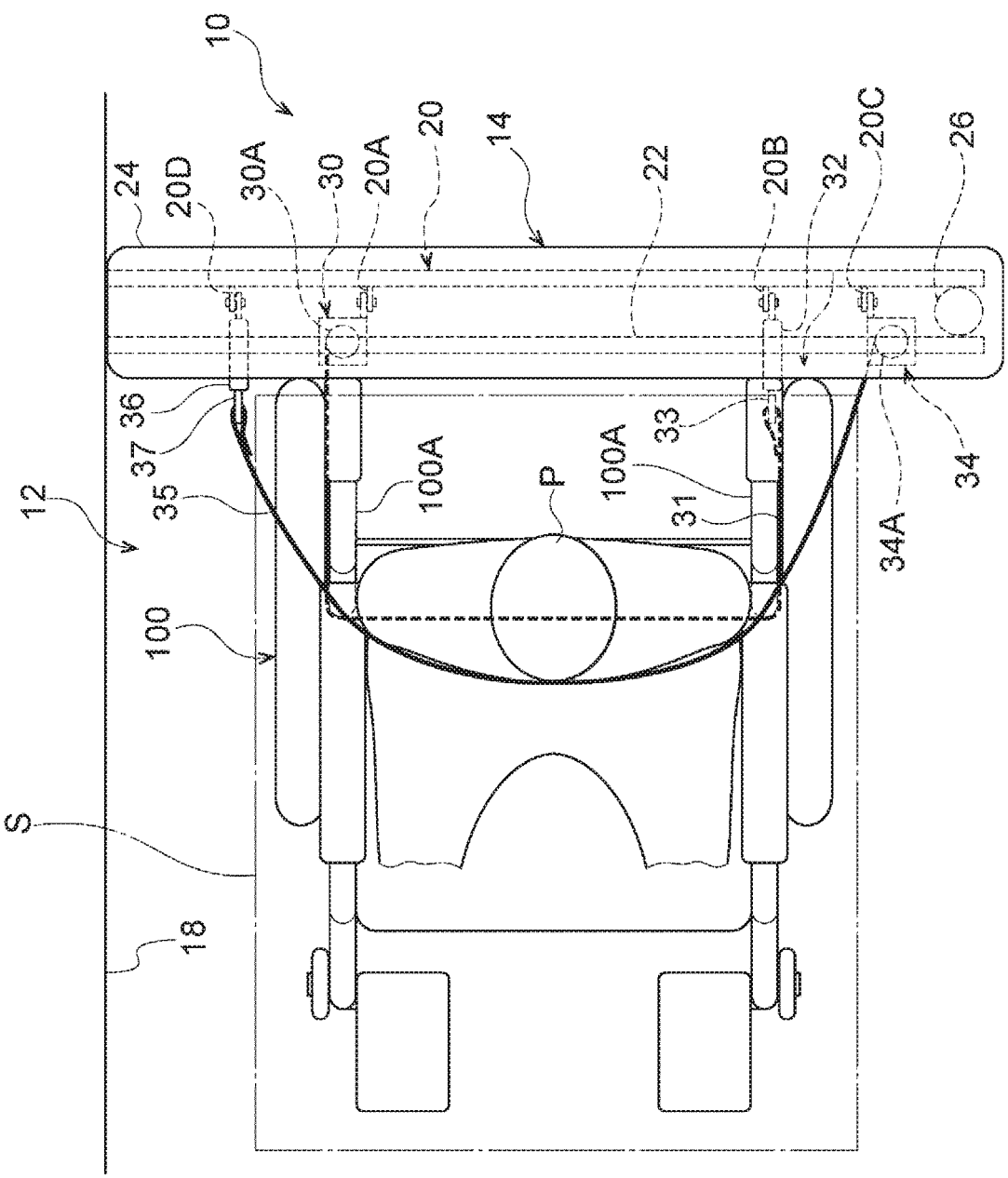
FIG. 2 is a plan view of the cabin interior of the vehicle to which the wheelchair-bound passenger restraint device according to the embodiment is applied, as viewed from above the vehicle.

As shown in FIGS. 1 and 2, in a vehicle 12 to which the wheelchair-bound passenger restraint device 10 according to the present embodiment is applied, a binding space S for binding a wheelchair 100 is set, and an upright wall 14 as an upright member is provided behind the binding space S.

The upright wall 14 is erected on a floor panel 16, is extended in the vehicle vertical direction and a vehicle width direction, and is configured to include a belt fixation plate 20, a support plate 22, and a cover 24. The belt fixation plate 20 is located at a lower portion of the upright wall 14, and is extended in the vehicle width direction, with a through-thickness direction of the belt fixation plate 20 coinciding with the vehicle longitudinal direction. Besides, a right end portion of the belt fixation plate 20 with respect to the vehicle is fixed to a cabin lateral wall 18, and a left end portion of the belt fixation plate 20 with respect to the vehicle is fixed to a handrail 26 as an upright member erected on the floor panel 16.

The handrail 26 is substantially cylindrically formed, and is extended to a ceiling portion of the vehicle 12. Besides, a left end portion of the support plate 22 with respect to the vehicle is fixed to the handrail 26.

The support plate 22 is located at an upper portion of the upright wall 14, and constitutes a receiving surface that can support the wheelchair 100 from behind the vehicle. In concrete terms, that region of the support plate 22 which is located in front of the belt fixation plate 20 with respect to the vehicle is extended in the vehicle width direction, with the through-thickness direction of the support plate 22 coinciding with the vehicle longitudinal direction. Besides, the right end portion of the support plate 22 with respect to the vehicle is fixed to the cabin lateral wall 18, and the left end portion of the support plate 22 with respect to the vehicle is fixed to the handrail 26 as described above.

The cover 24 is an interior trim, and is erected on the floor panel 16. Moreover, the belt fixation plate 20 and the support plate 22 are entirely covered with this cover 24.

It should be noted herein that a wheelchair retractor 30, a wheelchair buckle 32, a passenger retractor 34, and a passenger buckle 36 are attached to the belt fixation plate 20. Incidentally, in FIG. 1, the wheelchair retractor 30 and the wheelchair buckle 32 are depicted as being located at different heights, for the sake of convenience of explanation. In the present embodiment, however, the wheelchair retractor 30 and the wheelchair buckle 32 are disposed substantially at the same height. By the same token, the passenger retractor 34 and the passenger buckle 36 are depicted as being located at different heights. In the present embodiment, however, the passenger retractor 34 and the passenger buckle 36 are disposed substantially at the same height.

A first attachment strip 20A is extended forward with respect to the vehicle from a lower end portion of the belt fixation plate 20. As shown in FIG. 2, the first attachment strip 20A is provided on the right side of the binding space S with respect to the vehicle. "The right side of the binding space S with respect to the vehicle" mentioned herein means the right side of a center of the binding space S in the vehicle width direction with respect to the vehicle. Moreover, the wheelchair retractor 30 is fastened to this first attachment strip 20A by a bolt and a nut.

As shown in FIG. 1, the wheelchair retractor 30 is equipped with a spool 30A. One end portion of the wheelchair belt member 31 has been rewound in an extractable manner by this spool 30A. The spool 30A is urged in such a direction as to rewind the wheelchair belt member 31 by a return spring (not shown). Therefore, the wheelchair belt member 31 has been rewound, except for the other end portion thereof, by the wheelchair retractor 30, with no load applied to the wheelchair belt member 31. It should be noted herein that the wheelchair belt member 31 is fastened to the first attachment strip 20A with the wheelchair retractor 30 inclined, such that the wheelchair belt member 31 is diagonally extracted forward and upward with respect to the vehicle, as an example in the present embodiment.

Besides, the wheelchair retractor 30 is equipped with an emergency lock mechanism (an emergency locking retractor or ELR) that restricts the extraction of the wheelchair belt member 31 in extracting this wheelchair belt member 31 in case of an emergency such as a collision of the vehicle 12 or the like. Furthermore, the wheelchair retractor 30 is equipped with a wheelchair belt lock mechanism 63 that locks and unlocks the extraction of the wheelchair belt member 31 (see FIG. 3). This wheelchair belt lock mechanism 63 is configured to be able to electrically make a changeover between a locked state in which the wheelchair belt member 31 cannot be extracted and an unlocked state in which the wheelchair belt member 31 can be extracted. As this lock mechanism, the wheelchair belt lock mechanism 63 that employs a solenoid and a lock lever is adopted in the present embodiment. In this wheelchair belt lock mechanism 63, the spool 30A is rendered in the unlocked state by moving the lock lever through energization of the solenoid. On the other hand, when the solenoid is not energized, the lock lever moves to the other side to render the spool 30A in the locked state.

The wheelchair belt member 31 is lengthwise formed of the same cloth material as a webbing for restraining a passenger P. That is, the wheelchair belt member 31 is formed of the same cloth material as a passenger belt member 35 that will be described later. Besides, as an example in the present embodiment, a mark as an imitative representation of a wheelchair is depicted on one surface of the wheelchair belt member 31, so it is possible to instinctively recognize that the wheelchair belt member 31 is a belt for binding the wheelchair 100. Furthermore, a wheelchair tongue plate 33 is attached to the other end portion of the wheelchair belt member 31.

As shown in FIG. 2, a second attachment strip 20B is provided on the left side of the first attachment strip 20A with respect to the vehicle. As is the case with the first attachment strip 20A, the second attachment strip 20B is extended forward with respect to the vehicle from the lower end portion of the belt fixation plate 20. The wheelchair buckle 32 is fastened to this second attachment strip 20B by a bolt and a nut.

The wheelchair buckle 32 is disposed on the other side of the wheelchair retractor 30 with respect to the binding space S. The wheelchair tongue plate 33 can be fitted to this wheelchair buckle 32. Besides, the wheelchair buckle 32 is provided with a buckle sensor 64 that detects that the wheelchair tongue plate 33 has been fitted to the wheelchair buckle 32 (see FIG. 3). Incidentally, "the other side of the wheelchair retractor 30 with respect to the binding space S" mentioned herein means the other side of the wheelchair retractor 30 with respect to the center of the binding space S in the vehicle width direction. Besides, the wheelchair buckle 32 of the present embodiment is fastened to the second attachment strip 20B with the wheelchair buckle 32 inclined such that an insertion hole of the wheelchair tongue plate 33 is diagonally oriented forward and upward with respect to the vehicle, so as to facilitate the fitting of the wheelchair tongue plate 33 to the wheelchair buckle 32.

FIGS. 1 and 2 show a state where the wheelchair tongue plate 33 is fitted to the wheelchair buckle 32 through a frame 100A of the wheelchair 100. The wheelchair 100 is bound in this state.

A third attachment strip 20C is provided on the left side of the second attachment strip 20B with respect to the vehicle. The third attachment strip 20C is extended forward with respect to the vehicle from an upper end portion of the belt fixation plate 20. The passenger retractor 34 is fastened to this third attachment strip 20C by a bolt and a nut. That is, the passenger retractor 34 is disposed further from the binding space S than the wheelchair buckle 32. Besides, the passenger retractor 34 is disposed above the wheelchair buckle 32 with respect to the vehicle.

As shown in FIG. 1, the passenger retractor 34 is equipped with a spool 34A. One end portion of the passenger belt member 35 has been rewound in an extractable manner by this spool 34A. The spool 34A is urged in such a direction as to rewind the passenger belt member 35 by a return spring (not shown). Therefore, the passenger belt member 35 has been rewound, except for the other end portion thereof, by the passenger retractor 34 when no load is applied to the passenger belt member 35. It should be noted herein that the passenger reactor 34 is fastened to the third attachment strip 20C in a state of being inclined such that the passenger belt member 35 is diagonally extracted forward and upward with respect to the vehicle, as an example in the present embodiment.

Besides, the passenger retractor 34 is equipped with an emergency lock mechanism (an emergency locking retractor or ELR) that restricts the extraction of the passenger belt member 35 in extracting this passenger belt member 35 in case of an emergency such as a collision of the vehicle 12 or the like.

Figure 3:
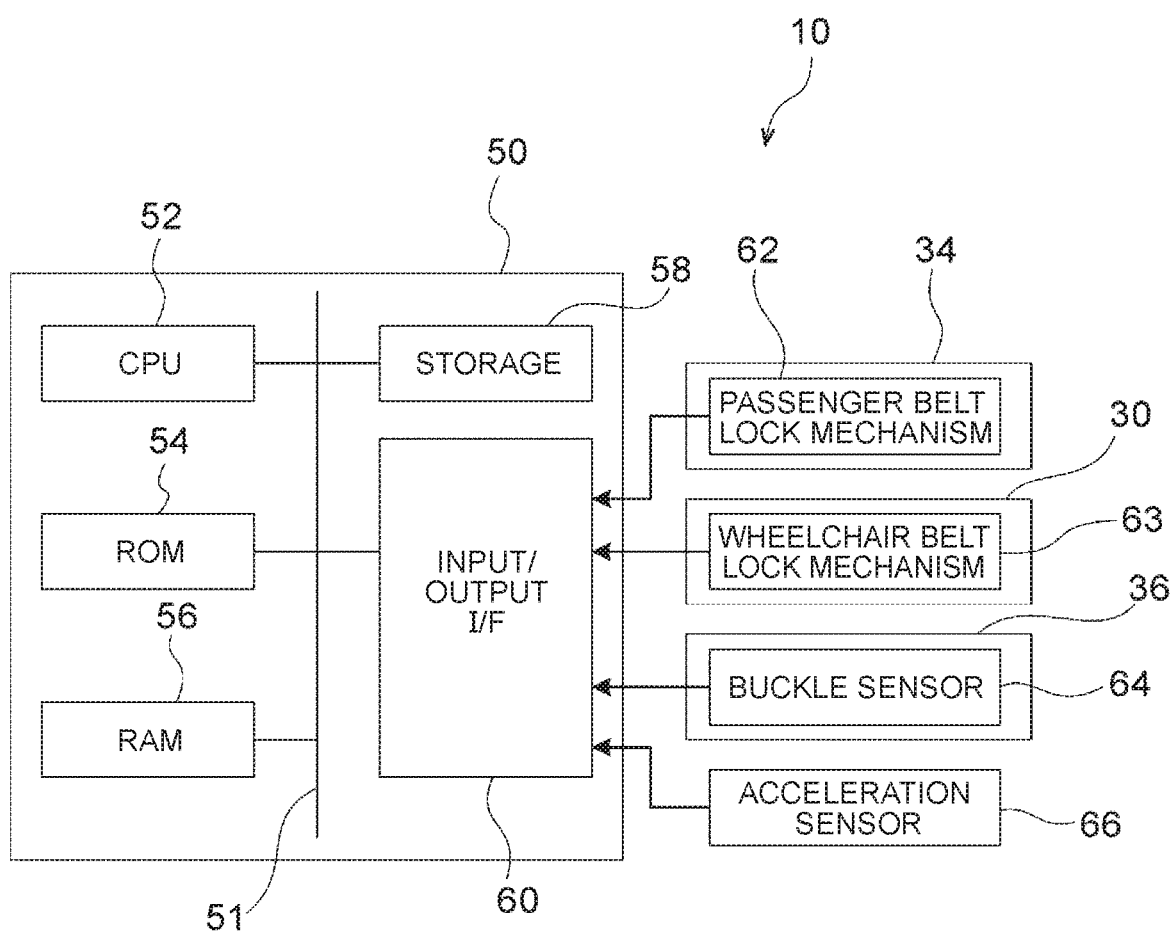
FIG. 3 is a block diagram showing a hardware configuration of the wheelchair-bound passenger restraint device according to the embodiment.

It should be noted herein that the passenger retractor 34 is equipped with a passenger belt lock mechanism 62 that locks and unlocks the extraction of the passenger belt member 35 (see FIG. 3). This passenger belt lock mechanism 62 is configured to be able to electrically make a changeover between a locked state in which the passenger belt member 35 cannot be extracted and an unlocked state in which the passenger belt member 35 can be extracted. As this lock mechanism, the passenger belt lock mechanism 62 that employs a solenoid and a lock lever is adopted in the present embodiment. In this passenger belt lock mechanism 62, the spool 34A is rendered in the unlocked state by moving the lock lever through energization of the solenoid. On the other hand, when the solenoid is not energized, the lock lever moves to the other side to render the spool 34A in the locked state.

As shown in FIG. 2, a fourth attachment strip 20D is provided on the right side of the first attachment strip 20A with respect to the vehicle. As is the case with the third attachment strip 20C, the fourth attachment strip 20D is extended forward with respect to the vehicle from the upper end portion of the belt fixation plate 20. The passenger buckle 36 is fastened to this fourth attachment strip 20D by a bolt and a nut. That is, the passenger buckle 36 is disposed further from the binding space S than the wheelchair retractor 30. Besides, the passenger buckle 36 is disposed above the wheelchair retractor 30 with respect to the vehicle.

The passenger buckle 36 is disposed on the other side of the passenger retractor 34 with respect to the binding space S. Besides, the passenger tongue plate 37 attached to the other end portion of the passenger belt member 35 can be fitted to the passenger buckle 36. Besides, the passenger buckle 36 of the present embodiment is fastened to the fourth attachment strip 20D while being inclined such that an insertion hole of the passenger tongue plate 37 is diagonally oriented forward and upward with respect to the vehicle, so as to facilitate the fitting of the passenger tongue plate 37 to the passenger buckle 36.

As described above, in the present embodiment, the wheelchair retractor 30, the wheelchair buckle 32, the passenger retractor 34, and the passenger buckle 36 are disposed on the belt fixation plate 20 that constitutes the upright wall 14. Therefore, the wheelchair retractor 30, the wheelchair buckle 32, the passenger retractor 34, and the passenger buckle 36 are reachable by the hands of the passenger P sitting in the wheelchair 100.

FIG. 3 is a block diagram showing a hardware configuration of the wheelchair-bound passenger restraint device 10. As shown in this FIG. 3, the wheelchair-bound passenger restraint device 10 is equipped with an electrical control unit (ECU) 50 as a control unit. Besides, the ECU 50 is configured to include a central processing unit or a processor (CPU) 52, a read only memory (ROM) 54, a random access memory (RAM) 56, a storage 58, and an input/output interface 60. The respective components are connected to one another via a bus 51 in a communicable manner.

The CPU 52 is a central processing unit that executes various programs and that controls the respective units. That is, the CPU 52 reads out the programs from the ROM 54 or the storage 58, and executes the programs with the RAM 56 serving as a work area. The CPU 52 performs the control of the aforementioned respective components and various arithmetic operations in accordance with the programs recorded in the ROM 54 or the storage 58.

The ROM 54 stores various programs and various data. The RAM 56 temporarily stores programs or data as a work area. The storage 58 is constituted by a hard disk drive (HDD) or a solid state drive (SSD), and stores various programs including an operating system, and various data. In the present embodiment, a lock changeover process program for changing over the passenger belt lock mechanism 62 in restraining the passenger P, a lock changeover process program for changing over the passenger belt lock mechanism 62 in case of an emergency with the passenger restrained, and the like are stored in the ROM 54 or the storage 58.

The passenger belt lock mechanism 62 (the passenger retractor 34), the wheelchair belt lock mechanism 63, and the buckle sensor 64 (the wheelchair buckle 32) are connected to the input/output interface 60. Besides, an acceleration sensor 66 that detects an acceleration applied to the vehicle 12 is connected to the input/output interface 60. Moreover, the passenger retractor 34 is performed based on a signal from the ECU 50.

Example of Lock Changeover Process

It should be noted herein that the ECU 50 changes over the passenger belt member 35 from the locked state to the unlocked state by the passenger belt lock mechanism 62, when the buckle sensor 64 detects that the wheelchair tongue plate 33 has been fitted to the wheelchair buckle 32. Besides, at least either when the acceleration detected by the acceleration sensor 66 is equal to or larger than a predetermined value or when the angle (inclination) of the vehicle 12 with respect to a horizontal line is equal to or larger than a predetermined value, the ECU 50 locks the extraction of the passenger belt member 35 by the passenger belt lock mechanism 62. An example of this lock changeover process will be described with reference to flowcharts of FIGS. 4 and 5. When the CPU 52 reads out a lock changeover program from the ROM 54 or the storage 58, deploys the program in the RAM 56, and executes the program, this lock changeover process is thereby performed. First of all, the lock changeover process in restraining the passenger P will be described with reference to FIG. 4, and then, the lock changeover process in case of an emergency will be described with reference to FIG. 5.

Figure 4:
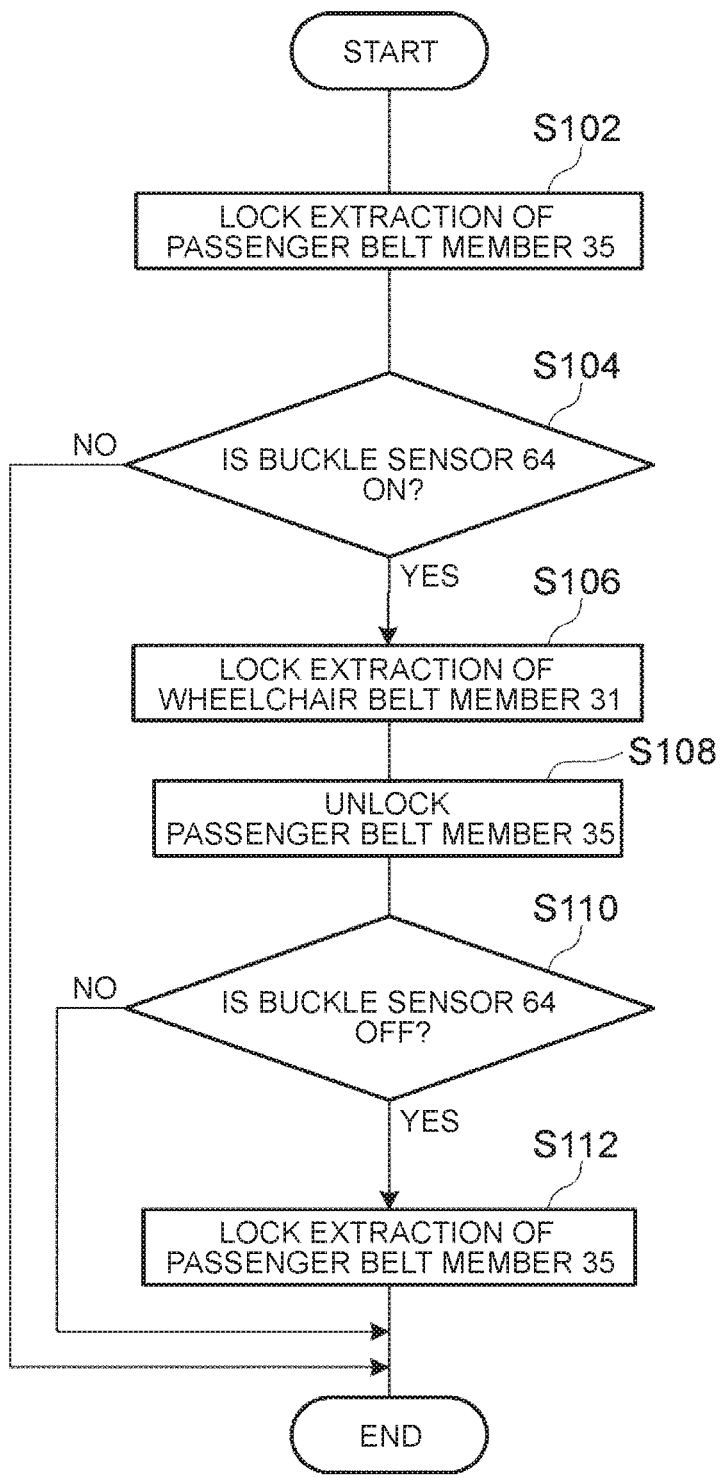
FIG. 4 is a flowchart showing a lock changeover process in restraining a passenger.

As shown in FIG. 4, in step S102, the CPU 52 locks the extraction of the passenger belt member 35 by the passenger belt lock mechanism 62. That is, the CPU 52 changes over the passenger belt lock mechanism 62 to the locked state. When the passenger belt lock mechanism 62 is in the locked state, this locked state is maintained.

The CPU 52 determines in step S104 whether or not the buckle sensor 64 of the wheelchair buckle 32 is ON. When the wheelchair tongue plate 33 is fitted to the wheelchair buckle 32, a signal is transmitted from the buckle sensor 64 to the ECU 50, and the CPU 52 determines that the buckle sensor 64 has turned ON. Besides, when the wheelchair tongue plate 33 is not fitted to the wheelchair buckle 32, the buckle sensor 64 is OFF. That is, it is determined that the buckle sensor 64 is not ON.

If it is determined in step S104 that the buckle sensor 64 is ON, the CPU 52 makes a transition to the processing of step S106. Besides, if it is determined in step S104 that the buckle sensor 64 is not ON, the CPU 52 ends the lock changeover process.

The CPU 52 locks the wheelchair belt member 31 by the wheelchair belt lock mechanism 63 in step S106. That is, the CPU 52 makes the wheelchair belt member 31 unextractable from the wheelchair retractor 30.

Subsequently, the CPU 52 cancels the locked state by the passenger belt lock mechanism 62 in step S108. That is, the spool 34A of the passenger retractor 34 is rendered in the unlocked state. Thus, the spool 34A becomes unable to rotate, and it becomes possible to extract the passenger belt member 35 from the passenger retractor 34. Incidentally, the processing of step S106 and the processing of step S108 may be performed in reverse order, or substantially at the same time.

Subsequently, the CPU 52 determines in step S110 whether or not the buckle sensor 64 has turned OFF. That is, when the passenger P in the wheelchair 100 gets off, the wheelchair tongue plate 33 binding the wheelchair 100 is removed from the wheelchair buckle 32 after removing the passenger belt member 35. Thus, a signal is transmitted from the buckle sensor 64 to the ECU 50, and the CPU 52 determines that the buckle sensor 64 has turned OFF. Besides, when the wheelchair tongue plate 33 remains fitted to the wheelchair buckle 32, the CPU 52 determines that the buckle sensor 64 has remained ON. That is, the CPU 52 determines that the buckle sensor 64 is not OFF.

If it is determined in step S110 that the buckle sensor 64 is OFF, the CPU 52 makes a transition to the processing of step S112. Besides, if it is determined in step S110 that the buckle sensor 64 is not OFF, the CPU 52 ends the lock changeover process.

The CPU 52 ends the lock changeover process by locking the extraction of the passenger belt member 35 by the passenger belt lock mechanism 62 in step S112. That is, the CPU 52 changes over the passenger belt lock mechanism 62 to the locked state, and makes the passenger belt member 35 unextractable from the passenger retractor 34.

Next, the lock changeover process in case of an emergency with the passenger P restrained will be described with reference to FIG. 5.

Figure 5:
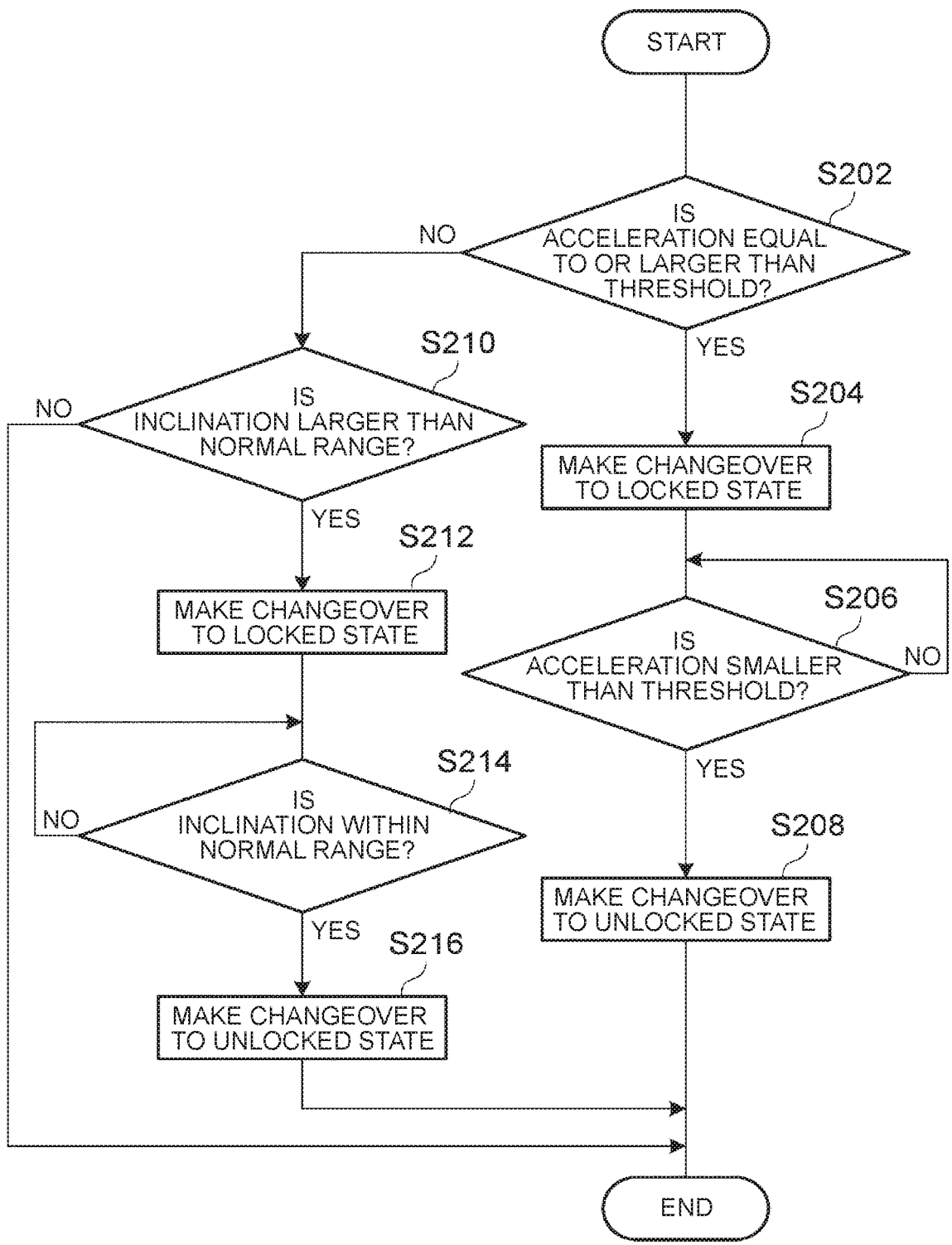
FIG. 5 is a flowchart showing the lock changeover process in case of an emergency with the passenger restrained.

As shown in FIG. 5, the CPU 52 determines in step S202 whether or not the acceleration of the vehicle 12 is equal to or larger than a predetermined threshold (a predetermined value). If the acceleration of the vehicle 12 detected by the acceleration sensor 66 is equal to or larger than the predetermined value, the CPU 52 makes a transition to the processing of step S204. Besides, if the acceleration of the vehicle 12 detected by the acceleration sensor 66 is smaller than the predetermined threshold, the CPU 52 makes a transition to the processing of step S210.

If the acceleration of the vehicle 12 is equal to or larger than the predetermined value, the CPU 52 locks the extraction of the passenger belt member 35 by the passenger belt lock mechanism 62 in step S204. That is, the CPU 52 renders the spool 34A in the locked state by electrically changing over the passenger belt lock mechanism 62. When the extraction of the passenger belt member 35 is thus locked, the passenger P is thereby restrained from moving by inertia.

Subsequently, the CPU 52 determines in step S206 whether or not the acceleration of the vehicle 12 is smaller than the predetermined threshold (the predetermined value). That is, if the acceleration of the vehicle 12 detected by the acceleration sensor 66 has become smaller than the predetermined value, the CPU 52 makes a transition to the processing of step S208. Besides, if the acceleration of the vehicle 12 is not smaller than the predetermined threshold, namely, if the acceleration of the vehicle 12 remains equal to or larger than the predetermined value, the CPU 52 repeats the processing of step S206.

The CPU 52 cancels the locked state by the passenger belt lock mechanism 62 in step S208. That is, the CPU 52 renders the spool 34A of the passenger retractor 34 in the unlocked state by moving a lock lever through energization of a solenoid. Then, the CPU 52 ends the lock changeover process.

On the other hand, if the acceleration of the vehicle 12 detected by the acceleration sensor 66 in step S202 is smaller than the predetermined threshold, the CPU 52 makes a transition to the processing of step S210 as described above.

The CPU 52 determines in step S210 whether or not the inclination of the vehicle 12 is larger than a normal range. The CPU 52 calculates an angle (inclination) of the vehicle 12 with respect to the horizontal line, based on a signal from the acceleration sensor 66, as an example in the present embodiment. Then, if this angle is equal to or larger than the predetermined value, the CPU 52 determines that the inclination of the vehicle 12 is larger than the normal range, and makes a transition to the processing of step S212. Besides, if the angle of the vehicle 12 with respect to the horizontal line is smaller than the predetermined value, the CPU 52 determines that the inclination of the vehicle 12 is within the normal range, and ends the lock changeover process. That is, if the acceleration of the vehicle 12 is smaller than the predetermined value and the inclination of the vehicle 12 is within the normal range, the CPU 52 ends the process without changing over the passenger belt lock mechanism 62.

The CPU 52 locks the extraction of the passenger belt member 35 by the passenger belt lock mechanism 62 in step S212. That is, the spool 34A is rendered in the locked state by electrically changing over the passenger belt lock mechanism 62. The passenger P is restrained from moving by inertia, by locking the extraction of the passenger belt member 35.

The CPU 52 determines in step S214 whether or not the inclination of the vehicle 12 is within the normal range. Then, if the angle of the vehicle 12 with respect to the horizontal line is smaller than the predetermined value, the CPU 52 determines that the inclination of the vehicle 12 is within the normal range, and makes a transition to the processing of step S216. Besides, if this angle is equal to or larger than the predetermined value, the CPU 52 determines that the inclination of the vehicle 12 is larger than the normal range, and repeats the processing of step S214.

The CPU 52 cancels the locked state by the passenger belt lock mechanism 62 in step S216. That is, the CPU 52 renders the spool 34A of the passenger retractor 34 in the unlocked state by moving the lock lever through energization of the solenoid. Then, the CPU 52 ends the lock changeover process.

Operation

Next, the operation of the present embodiment will be described.

In the wheelchair-bound passenger restraint device 10 according to the present embodiment, when the wheelchair belt member 31 is extracted from the wheelchair retractor 30 and passed through the frame 100A of the wheelchair 100 and the wheelchair tongue plate 33 is fitted to the wheelchair buckle 32 with the wheelchair 100 moved to the binding space S as shown in FIGS. 1 and 2, the wheelchair 100 can be bound. Besides, when the passenger belt member 35 is extracted from the passenger retractor 34 and the passenger tongue plate 37 is fitted to the passenger buckle 36 with the wheelchair 100 bound, the passenger P in the wheelchair 100 can be restrained.

It should be noted herein that when the buckle sensor 64 detects that the wheelchair tongue plate 33 has been fitted to the wheelchair buckle 32, the passenger belt lock mechanism 62 makes a changeover from the locked state to the unlocked state, as described with reference to the flowchart of FIG. 4, in the present embodiment. Thus, the passenger belt member 35 cannot be extracted from the passenger retractor 34, unless the wheelchair 100 is bound. As a result, the wheelchair 100 can be restrained from being forgotten to be bound. Besides, the passenger P is restrained after binding the wheelchair 100, so no restrictions are imposed on the movement of the passenger P in binding the wheelchair 100. As a result, the binding of the wheelchair 100 and the restraint of the passenger P can be efficiently carried out while restraining the wheelchair 100 from being forgotten to be bound.

In particular, the present embodiment has a structure in which the locking is electrically changed over by the passenger belt lock mechanism 62. Therefore, a simpler structure can be realized than in the configuration in which a changeover is mechanically made between the locking of the passenger belt member 35 and the unlocking of the passenger belt member 35. That is, the passenger belt lock mechanism 62 can be reduced in size.

Besides, in the present embodiment, the wheelchair belt member 31 can be made unextractable by the wheelchair belt lock mechanism 63, simply by fitting the wheelchair tongue plate 33 to the wheelchair buckle 32. Thus, the extraction of the wheelchair belt member 31 can be locked without requiring the passenger P to perform any special operation.

In particular, the present embodiment has a structure in which the locking is electrically changed over by the wheelchair belt lock mechanism 63. Therefore, a simpler structure can be realized than in the configuration in which a changeover is mechanically made between the locking of the wheelchair belt member 31 and the unlocking of the wheelchair belt member 31. That is, the wheelchair belt lock mechanism 63 can be reduced in size.

Furthermore, in the present embodiment, the wheelchair retractor 30, the wheelchair buckle 32, the passenger retractor 34, and the passenger buckle 36 are attached to the belt fixation plate 20, as shown in FIG. 1. Thus, the passenger P sitting in the wheelchair 100 can extract the wheelchair belt member 31 from the wheelchair retractor 30 using his or her own hands. Also, the passenger P can extract the passenger belt member 35 from the passenger retractor 34.

Still further, in the present embodiment, the passenger retractor 34 and the passenger buckle 36 for restraining the passenger P are disposed above the wheelchair retractor 30 and the wheelchair buckle 32 for binding the wheelchair 100, with respect to the vehicle. Therefore, the wheelchair belt member 31 does not become an obstacle in restraining the passenger P. That is, the passenger P can be more smoothly restrained than in the structure in which the passenger retractor 34 and the wheelchair buckle 32 are disposed at the same height.

Besides, the passenger retractor 34 according to the present embodiment is disposed on the same side as the wheelchair buckle 32 with respect to the binding space S. Thus, after fitting the wheelchair tongue plate 33 to the wheelchair buckle 32, the passenger P can subsequently extract the passenger belt member 35 from the passenger retractor 34. That is, the passenger P can be smoothly restrained, and the time needed to bind the wheelchair 100 and restrain the passenger P can be reduced.

Furthermore, in the present embodiment, the passenger retractor 34 and the passenger buckle 36 are disposed further from the binding space S than the wheelchair buckle 32 and the wheelchair retractor 30, as shown in FIG. 2. That is, the passenger retractor 34 and the wheelchair buckle 32 are arranged at positions that are different from each other in distance from the binding space S in the vehicle width direction in a plan view. Accordingly, in this respect as well, the wheelchair belt member 31 does not become an obstacle in restraining the passenger P, and the passenger P can be smoothly restrained.

Still further, in the present embodiment, the extraction of the passenger belt member 35 is locked when the acceleration of the vehicle 12 becomes equal to or larger than a predetermined value or when the angle of the vehicle 12 with respect to the horizontal line becomes equal to or larger than a predetermined value, as described with reference to the flowchart of FIG. 5. Thus, the passenger P in the wheelchair 100 can be restrained well, and the performance of ensuring the safety of the passenger P can be improved.

Incidentally, in the present embodiment, the so-called two-point seat belt is used as the belt for restraining the passenger P, but the disclosure is not limited thereto. For example, the structure of a first modification example shown in FIG. 6 may be adopted. Besides, in the present embodiment, the passenger retractor 34 and the wheelchair buckle 32 are disposed on the same side with respect to the binding space S, but the disclosure is not limited thereto. For example, the structure of a second modification example shown in FIG. 7 may be adopted.

First Modification Example

Figure 6:
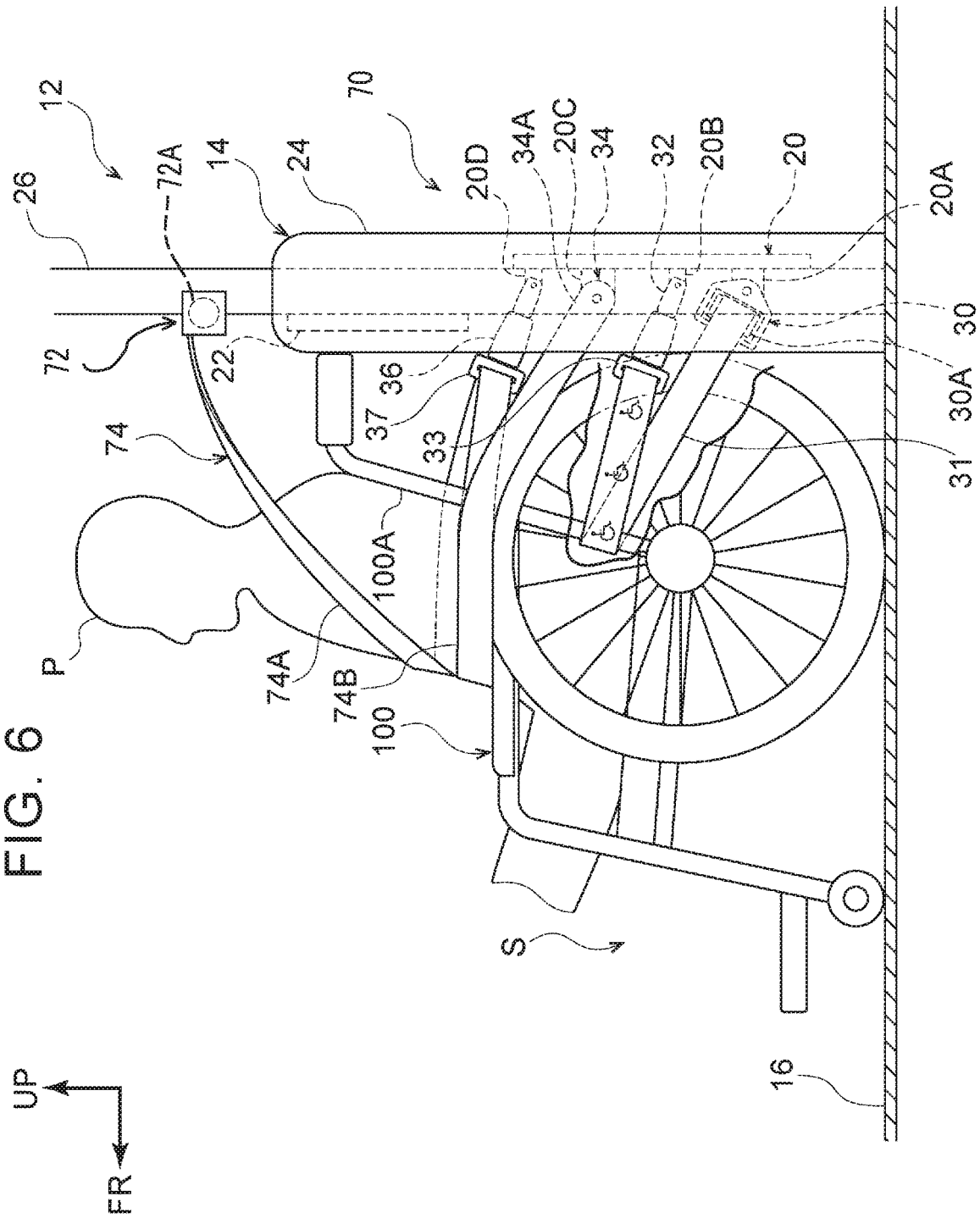
FIG. 6 is a lateral view corresponding to FIG. 1, showing a first modification example of the wheelchair-bound passenger restraint device according to the embodiment.

As shown in FIG. 6, in a wheelchair-bound passenger restraint device 70 according to the present modification example, a passenger retractor 72 is attached to the handrail 26. The passenger retractor 72 is disposed above the support plate 22 with respect to the vehicle, and is equipped with a spool 72A. Moreover, one end portion of a passenger belt member 74 has been rewound in an extractable manner by this spool 72A. The spool 72A is urged in such a direction as to rewind the passenger belt member 74 by a return spring (not shown). Therefore, the passenger belt member 74 has been rewound, except for the other end portion thereof, by the passenger retractor 72 when no load is applied to the passenger belt member 74.

Besides, the passenger retractor 72 is equipped with an emergency lock mechanism (an emergency locking retractor or ELR) that restricts the extraction of the passenger belt member 74 in extracting this passenger belt member 74 in case of an emergency such as a collision of the vehicle 12 or the like.

The other end portion of the passenger belt member 74 is fixed to the third attachment strip 20C of the belt fixation plate 20. That is, in the present modification example, the third attachment strip 20C functions as an anchor. Besides, the passenger tongue plate 37 is passed through the passenger belt member 74. This passenger tongue plate 37 is fitted to the passenger buckle 36.

It should be noted herein that the passenger belt member 74 is configured to include a shoulder belt portion 74A that restrains the state of the passenger P, and a lap belt portion 74B that restrains lumbar parts of the passenger P. That is, that region of the passenger belt member 74 which has been extracted from the passenger retractor 72 to be diagonally extended from a left shoulder part of the passenger P to the right lumbar part thereof is the shoulder belt portion 74A. Besides, that region of the passenger belt member 74 which is extended from the right lumbar part of the passenger P to the left lumbar part thereof in the vehicle width direction is the lap belt portion 74B.

As described above, in the present modification example, the passenger P is restrained by the three-point seat belt. The performance of ensuring the safety of the passenger P can be further improved than in the case where the passenger P is restrained by the two-point seat belt.

Second Modification Example

As shown in FIG. 7, a wheelchair-bound passenger restraint device 80 according to the present modification example is identical in configuration to that of the embodiment except in that the passenger retractor 34 and the passenger buckle 36 are reversed in position.

That is, in the present modification example, the passenger retractor 34 is fastened to the fourth attachment strip 20D provided on the right side of the first attachment strip 20A with respect to the vehicle. The passenger belt member 35 has been rewound in an extractable manner by this passenger retractor 34.

On the other hand, the passenger buckle 36 is fastened to the third attachment strip 20C provided on the left side of the second attachment strip 20B with respect to the vehicle. The passenger tongue plate 37 can be fitted to this passenger buckle 36.

As described above, with the structure of the present modification example as well, the passenger belt lock mechanism 62 makes a changeover from the locked state to the unlocked state when it is detected that the wheelchair tongue plate 33 has been fitted to the wheelchair buckle 32. Thus, before the wheelchair 100 is bound, the passenger belt member 35 cannot be extracted, so the wheelchair 100 can be restrained from being forgotten to be bound.

Although the wheelchair-bound passenger restraint devices according to the embodiment and the modification examples have been described above, it is obvious that the disclosure can be carried out in various modes within such a range as not to depart from the gist thereof. For example, the aforementioned embodiment and modification examples adopt the configuration in which the passenger belt lock mechanism 62 makes a changeover from the locked state to the unlocked state when the buckle sensor 64 detects that the wheelchair tongue plate 33 has been fitted to the wheelchair buckle 32, but the disclosure is not limited thereto. That is, a changeover to the unlocked state may be made when an indoor camera or the like detects the wheelchair 100 in addition to detection by the buckle sensor 64. In this manner, even in the case where the wheelchair tongue plate 33 is erroneously fitted to the wheelchair buckle 32 when the passenger P in the wheelchair 100 is not in the vehicle, the locked state of the passenger retractor 34 can be maintained.

Besides, in the aforementioned embodiment and modification examples, the passenger retractor 34 is disposed further from the binding space S than the wheelchair buckle 32 as shown in FIG. 2, but the disclosure is not limited thereto. For example, when the passenger retractor 34 is disposed at the same position as the wheelchair buckle 32 in the vehicle width direction and above the wheelchair buckle 32 with respect to the vehicle, the wheelchair belt member 31 does not become an obstacle in restraining the passenger P. Besides, the passenger retractor 34 may be disposed closer to the binding space S than the wheelchair buckle 32.

Furthermore, in the aforementioned embodiment and modification examples, the passenger retractor 34 is disposed above the wheelchair buckle 32 with respect to the vehicle as shown in FIG. 1, but the disclosure is not limited thereto. For example, when the passenger retractor 34 is disposed at the same height as the wheelchair buckle 32 in the vehicle vertical direction and further from the binding space S than the wheelchair buckle 32, the wheelchair belt member 31 does not become an obstacle in restraining the passenger P. Besides, the passenger retractor 34 may be disposed below the wheelchair buckle 32 with respect to the vehicle.

Still further, the aforementioned embodiment and modification examples adopt the configuration in which a changeover between the locking and unlocking of the passenger retractor 34 is electrically made by the passenger belt lock mechanism 62 through the use of the solenoid and the lock lever, as shown in FIG. 3, but the disclosure is not limited thereto. For example, a changeover between the locking and unlocking of the passenger retractor 34 may be electrically made through the use of a motor or the like. Alternatively, a lock mechanism that mechanically makes a changeover between the locking and unlocking of the passenger belt member 35 may be provided. In this case, even when the supply of electric power is stopped, a changeover between the locking and unlocking of the passenger belt member 35 can be made.

Besides, in the aforementioned embodiment and modification examples, the mark as the imitative representation of the wheelchair is depicted on one surface of the wheelchair belt member 31, but the disclosure is not limited thereto. For example, the wheelchair belt member 31 and the passenger belt member 35 may be made distinct from each other in color, pattern, or the like, instead of using the mark. Alternatively, such distinction may be made by forming the wheelchair belt member 31 narrower than the passenger belt member 35.

Still further, an erroneous coupling prevention structure may be adopted for the wheelchair buckle 32 and the passenger buckle 36. That is, in the case where a seat for another passenger is disposed beside the binding space S, the erroneous coupling prevention mechanism may be adopted to prevent the passenger tongue plate 37 from being erroneously fitted to a buckle for this seat. A structure that changes the width and depth of the insertion holes of the wheelchair buckle 32 and the passenger buckle 36 may be adopted as this erroneous coupling prevention structure.

What is claimed is:

1. A wheelchair-bound passenger restraint device comprising:
   a wheelchair retractor that rewinds one end portion of a wheelchair belt member in an extractable manner;
   a wheelchair buckle that is able to be fitted with a wheelchair tongue plate that is attached to the other end portion of the wheelchair belt member;
   a passenger retractor that rewinds one end portion of a passenger belt member in an extractable manner;
   a passenger buckle that is able to be fitted with a passenger tongue plate that is attached to the other end portion of the passenger belt member;
   a buckle sensor that detects that the wheelchair tongue plate has been fitted to the wheelchair buckle; and
   a passenger belt lock mechanism that is configured to be able to make a changeover between a locked state in which the passenger belt member is unable to be extracted and an unlocked state in which the passenger belt member is able to be extracted, and that makes a changeover from the locked state to the unlocked state when the buckle sensor detects that the wheelchair tongue plate has been fitted to the wheelchair buckle.

2. The wheelchair-bound passenger restraint device according to claim 1, wherein
   the passenger belt lock mechanism is configured to be able to electrically make a changeover between the locked state and the unlocked state.

3. The wheelchair-bound passenger restraint device according to claim 1, further comprising:
   a wheelchair belt lock mechanism that makes the wheelchair belt member unextractable from the wheelchair retractor when the buckle sensor detects that the wheelchair tongue plate has been fitted to the wheelchair buckle.

4. The wheelchair-bound passenger restraint device according to claim 1, wherein the wheelchair buckle and the passenger buckle are disposed on an upright member erected in a cabin.

5. The wheelchair-bound passenger restraint device according to claim 4, wherein
   the passenger retractor and the wheelchair buckle are disposed at heights that are different from each other in a vehicle vertical direction.

* * * * *